United States Patent [19]

Gitlin et al.

[11] 4,237,554
[45] Dec. 2, 1980

[54] COEFFICIENT TAP LEAKAGE FOR FRACTIONALLY-SPACED EQUALIZERS

[75] Inventors: Richard D. Gitlin, Monmouth Beach; Howard C. Meadors, Jr., Ocean; Stephen B. Weinstein, Holmdel, all of N.J.

[73] Assignee: Bell Telephone Laboratories, Incorporated, Murray Hill, N.J.

[21] Appl. No.: 16,495

[22] Filed: Mar. 1, 1979

[51] Int. Cl.³ .............................................. H04B 3/04
[52] U.S. Cl. ..................................... 375/15; 333/18; 364/724
[58] Field of Search ................... 325/42, 65, 323, 324; 364/572, 581, 582, 724; 333/18; 328/162; 178/69 R, 69 M

[56] References Cited

U.S. PATENT DOCUMENTS

| | | | |
|---|---|---|---|
| 3,633,105 | 4/1972 | Lender et al. | 325/42 |
| 4,006,352 | 2/1977 | Sato | 364/724 |
| 4,034,199 | 7/1977 | Lampe et al. | 364/581 |
| 4,145,747 | 3/1979 | Sakaki et al. | 325/42 |

OTHER PUBLICATIONS

IEEE Transactions on Communications, vol. COM-24 #8, Aug. 1976, Ungerboeck, pp. 856-864.

*Primary Examiner*—Benedict V. Safourek
*Attorney, Agent, or Firm*—Ronald D. Slusky

[57] ABSTRACT

A quadrature amplitude modulated (QAM) data signal transmitted at T symbols per second is sampled in a data receiver at a rate of 2/T samples per second and applied to a transversal-type equalizer structure (25, 46, 34, 35) having taps spaced at T/2 second intervals. A demodulated equalized signal $(a_j, b_j)$, generated once every T seconds, is quantized to form a decision $(a_j^*, b_j^*)$ as to the value of the original modulating data symbol. An error signal $(e_j, \hat{e}_j)$ is formed in response to the pre- and post-quantized values of the demodulated equalized signal. Tap coefficients $(c_i(j), \hat{c}_i(j))$ in generating the equalized signals are updated in response to (a) a correction term which is a function of the error signal and (b) a predetermined tap leakage term which has a constant magnitude. The introduction of the tap leakage term maintains the coefficient values at minimum levels.

34 Claims, 3 Drawing Figures

COEFFICIENT TAP LEAKAGE FOR FRACTIONALLY-SPACED EQUALIZERS

BACKGROUND OF THE INVENTION

The present invention relates to automatic equalizers which compensate for the distorting effects of band-limited channels on transmitted data signals.

Automatic equalizers are necessary for accurate reception of high-speed data signals transmitted over band-limited channels with unknown transmission characteristics. The equalizer is generally in the form of a transversal filter in which successive samples of the incoming data signal are multiplied by respective tap coefficients. The resulting products are added together to generate an "equalized" signal which is then demodulated and/or quantized to recover the transmitted data. In addition, an error signal is formed equal to the difference between the equalized signal and a reference signal which represents the transmitted data symbol. The value of the symbol that was transmitted may be known at the receiver, a priori as is the case in many equalizer start-up arrangements. Alternatively, as in the so-called adaptive type of automatic equalizer, the reference signal is derived from the decision made in the receiver (on the basis of the equalized signal value) as to what data symbol was transmitted. In either case, the error signal is used to update the tap coefficient values in such a way as to minimize a measure of the distortion—primarily intersymbol interference—introduced by the channel. The most commonly used error-directed coefficient updating algorithm is the so-called mean-squared error algorithm, which adjusts the tap coefficients so as to minimize the average of the value of the square of the error signal.

Most commercial data receivers, e.g., data modems, incorporate a synchronous, or baud, equalizer in which the received data signal is sampled at a rate equal to the symbol rate. It is, however, possible to use a so-called fractionally-spaced equalizer in which the received signal is sampled at a higher rate. Data decisions, i.e., quantizations of the equalized samples, are still made at the symbol rate. However, the fact that equalization is carried out using a finer sampling interval provides the fractionally-spaced equalizer with significant advantages over its more conventional cousin. Most notable among these is insensitivity to channel delay distortion, including sampling phase errors.

There is, however, at least one significant problem unique to the fractionally-spaced equalizer. In a synchronous equalizer, one set of tap coefficients is clearly optimum, i.e., provides the smallest mean-squared error. By contrast, many sets of coefficient values provide approximately the same mean-squared error in the fractionally-spaced equalizer. As a consequence of this property, the presence of small biases in the coefficient updating processing hardware—such as biases associated with signal value roundoff—can cause at least some of the coefficient values to drift to very large levels, or "blow-up", even though the mean-squared error remains at, or close to, its minimum value. The registers used to store the coefficients or other signals computed during normal equalizer operation can then overflow, causing severe degradation, or total collapse, of the system response.

The prior art—exemplified by G. Ungerboeck, "Fractional Tap-Spacing Equalizers and Consequences for Clock Recovery for Data Modems," *IEEE Trans. on Communications*, Vol. COM-24, No. 8, August 1976, pp. 856–864—suggests that the problem of coefficient value blow-up can be controlled by introducing one of two alternative auxiliary terms into the conventional updating algorithm. The auxiliary term may be, for example, a predetermined small fraction of the current value of the coefficient being updated. This implements a so-called tap leakage approach. Alternatively, a spectral zero-forcing approach is suggested. Here the auxiliary term is a predetermined small fraction of an alternating-sign sum of the current values of all the coefficients.

Having presented these approaches for controlling coefficient blow-up, the Ungerboeck article further reports that in a computer simulation of a fractionally-spaced equalizer, blow-up actually never occurred, at least when sufficient precision was used in the computations.

SUMMARY OF THE INVENTION

We have discovered that the blow-up of tap coefficients in fractionally-spaced equalizers is a more serious problem than has been heretofore recognized. Computer studies, such as reported in the prior art, typically simulate only several seconds of equalizer operation. We have found, however, that in an actual implementation, depending on the nature of the bias which causes the blow-up, it can take as much as forty-five minutes for the above-mentioned register overflow to occur.

Moreover, we have discovered that the techniques proposed in the prior art to deal with the coefficient blow-up, although perhaps effective in dealing with that problem, are not wholly satisfactory from other standpoints. For example, it is desirable in any transversal filter type of automatic equalizer to have as many of the coefficient values at or as close to zero as possible. This means that the numerical computations associated with coefficient updating will involve the manipulation and storage of smaller numbers than would otherwise be the case. This, in turn, minimizes the complexity and expense of the computational hardware. In addition, keeping as many of the coefficient values at or as close to zero as possible best conditions the system to withstand the effects of, and to recover from, phase hits and other transmission disturbances. The prior art approaches for dealing with coefficient blow-up, while providing an upper limit for the coefficient values, allow a large number of the coefficients to assume values which are not at or close to zero. Thus, system performance suffers.

The present invention provides a technique which not only prevents the blow-up of fractionally-spaced equalizer coefficients, but also minimizes their values. As in the prior art, a tap leakage term is introduced into the coefficient updating algorithm. Our invention differs from the prior art, however, in that the magnitude of the tap leakage term is independent of any coefficient value. In an illustrative embodiment, for example, the tap leakage term has a constant magnitude, its sign being such as to drive the magnitude of the coefficient then being updated in the direction of zero.

The efficacy of the present invention is a result of its "never-quit" approach; no matter how small any coefficient gets, the full value of the tap leakage term enters the updating computation. This approach is efficacious because it is directed to what we have discovered to be the cause of the coefficient blow-up problem—bias in the arithmetic operations. The prior art approaches, by contrast, by providing a correction term magnitude which is a function of coefficient magnitude, are directed only to the symptom, i.e., large coefficient values. The problem with such an approach is that the tap leakage or spectral zero-forcing terms used in the prior art may become so small that, due to roundoff inherent in the digital circuitry implementing the equalizer, no change from the value specified by the error-directed part of the updating algorithm is made. This opens the door for other coefficient magnitudes, theretofore at or close to zero, to begin to creep upward.

DETAILED DESCRIPTION

The present invention is illustrated herein in the context of a quadrature-amplitude modulated (QAM) digital data transmission system. Four paralleled information bits are illustratively transmitted during each symbol interval of duration $T=1/2400$ sec. The symbol rate is thus 2400 baud, yielding a binary data transmission rate of 9600 bits per second. During each symbol interval, the four bits to be transmitted are encoded into two data signals, each of which can take on one of the four values $\{+1, -1, +3, -3\}$. These two data signals, after baseband filtering, amplitude-modulate respective 1800-Hz carrier waves which are in quadrature relation, i.e., 90° out-of-phase with respect to one another. The modulated signals are added together and transmitted over a bandlimited data (e.g., voiceband telephone) channel.

Figure 1:
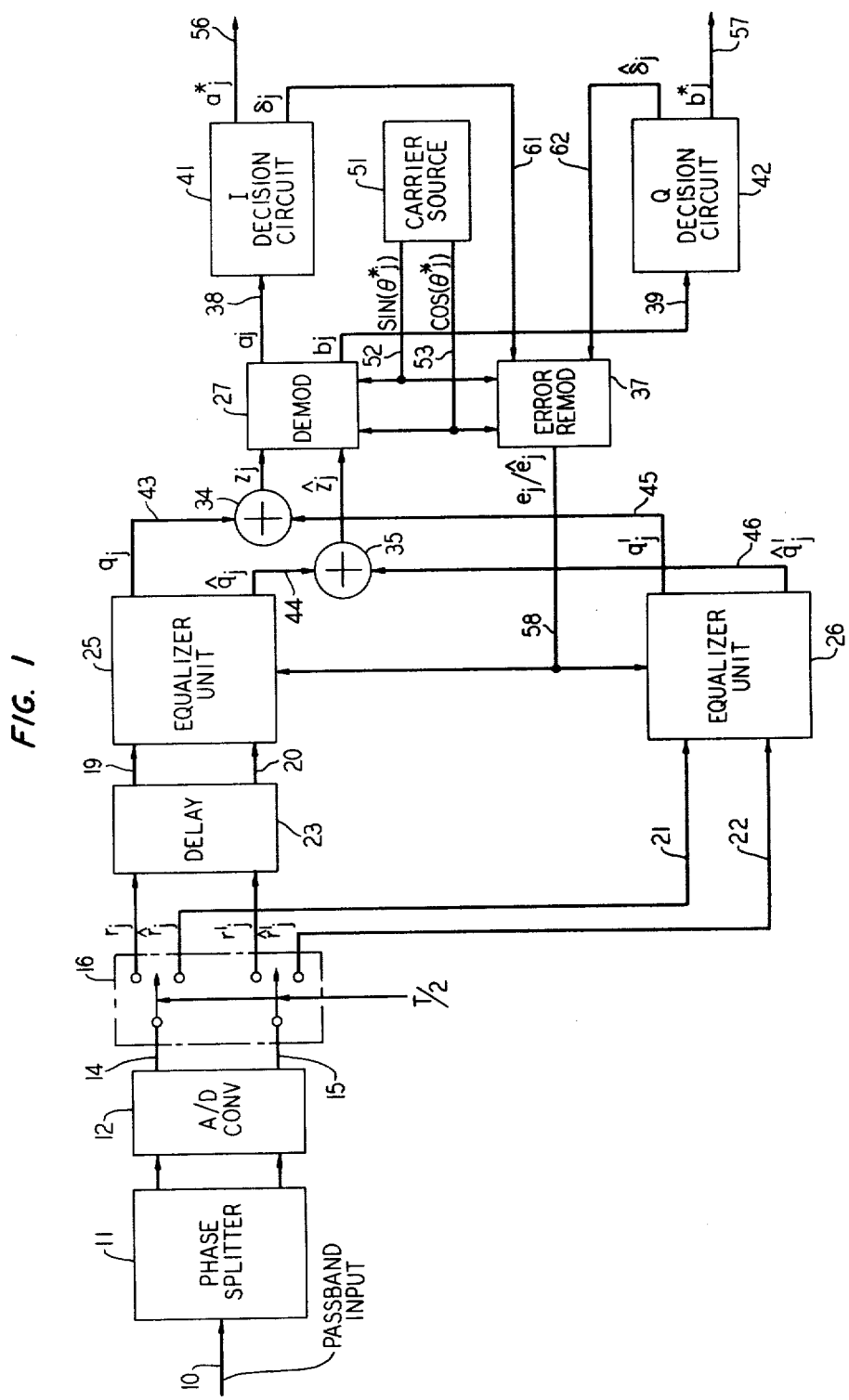
FIG. 1 shows a fractionally spaced equalizer/demodulator in which the tap leakage technique of the present invention is implemented.

FIG. 1 is a simplified block diagram of a fractionally-spaced equalizer/demodulator for use in a receiver for the above-described type of QAM signals. The tap coefficients used in the fractionally-spaced equalizer are updated in accordance with the tap leakage technique of the present invention.

More particularly, the received QAM passband signal on line 10 (which has been previously passed through a bandpass filter (not shown) is passed through a phase splitter 11. The latter generates two replicas of the received analog signal, one lagging the other by 90°. The signals, which are a Hilbert Transform pair, are passed to A/D converter 12.

In general, the above-described advantages provided by a fractionally-spaced equalizer are realized when the sample rate is at least $(1+\alpha)/T$, where $\alpha=(2Tf_{co}-)$, $f_{co}$ being the highest spectral component about the carrier frequency (i.e., the highest component in the modulating (baseband) signal) having at least a predetermined energy. The parameter $\alpha$ is referred to as the fractional excess bandwidth. A/D converter 12, in particular, illustratively operates at $2/T=4800$ times per second, i.e., twice the symbol rate, to generate two passband, i.e., modulated, signal samples $R_j$ and $R_j'$ during the $j^{th}$ receiver symbol interval. (An alternative way of generating $R_j$ and $R_j'$ is to first sample and digitize the received signal at a rate greater than twice its highest frequency component and then pass the resulting signal through a digital phase-splitter.)

QAM signals are conveniently expressed and processed as complex numbers, each having a real and imaginary component. The real and imaginary components of the samples formed by A/D converter 12 are provided in serial form as separate ten-bit digital signals, or words, on respective output leads 14 and 15. (Each of the other signal leads in FIG. 1 similarly carries it signals in serial form.) Notationally, the real and imaginary components of sample $R_j$ are represented as $r_j$ and $\hat{r}_j$. Those of sample $R_j'$ are represented as $r_j'$ and $\hat{r}_j'$.

Samples $R_j$ and $R_j'$, which are spaced $T/2$ seconds apart, are equalized using two synchronous equalizer units 25 and 26. Each of these units is adapted to operate on a complex sample stream in which the samples are spaced T seconds apart. Double-throw switch 16 applies components $r_j$ and $\hat{r}_j$ to equalizer unit 25 and components $r_j'$ and $\hat{r}_j'$ to equalizer unit 26. Separate data streams, each containing samples spaced T seconds apart, are thus presented to each equalizer unit. A delay unit 23 is interposed between switch 16 and equalizer unit 25 so that $r_j$ and $\hat{r}_j$ are applied to equalizer unit 25 at the same time that $r_j'$ and $\hat{r}_j'$ are applied to equalizer unit 26. This advantageously allows equalizer units 25 and 26 to be controlled by the same clocking and timing signals.

The output signal $Q_j$ of equalizer unit 25, described more fully below, is comprised of real and imaginary components $q_j$ and $\hat{q}_j$ which appear as ten-bit words on leads 43 and 44. Similarly, the output signal $Q_j'$ of equalizer unit 26 is comprised of real and imaginary components $q_j'$ and $\hat{q}_j'$, which appear on leads 45 and 46. Components $q_j$ and $q_j'$ are added together in an adder 34 while components $\hat{q}_j$ and $\hat{q}_j'$ are added together in an adder 35. The outputs of adders 34 and 35 are the real and imaginary components $z_j$ and $\hat{z}_j$ of a modulated equalized signal $Z_j$ associated with a particular transmitted symbol. (Signal $Z_j$ could have been equivalently generated using a single equalizer unit having taps spaced at $T/2$ second intervals.)

Signal $Z_j$ is demodulated to baseband by demodulator 27. The demodulated output of demodulator 27 is equalized signal $A_j$, which has real and imaginary components $a_j$ and $b_j$, provided as ten-bit words on leads 38 and 39, respectively. The demodulation process performed by demodulator 27 is expressed in complex notation as $$A_j = Z_j e^{-j\theta_j^*}$$

where $j=\sqrt{-1}$ and $\theta_j^*$ is an estimate of the current carrier phase. In terms of real and imaginary components, the demodulation process is expressed as $$a_j = z_j \cos(\theta_j^*) + \hat{z}_j \sin(\theta_j^*)$$
$$b_j = \hat{z}_j \cos(\theta_j^*) - z_j \sin(\theta_j^*).$$

For purposes of generating $a_j$ and $b_j$ in accordance with the above expressions, demodulator 27 receives nine-bit digital representations of $\sin(\theta_j^*)$ and $\cos(\theta_j^*)$ on output leads 52 and 53 of carrier source 51.

Components $a_j$ and $b_j$ are quantized in I (in-phase) decision circuit 41 and Q (quadrature-phase) decision circuit 42, respectively. The resulting outputs on leads 56 and 57 are decisions $a_j^*$ and $b_j^*$ as to the value of the data symbol with which equalized signal $Z_j$ is associated. Decisions $a_j^*$ and $b_j^*$ can be thought of as the real and imaginary components of a complex decision $A_j^*$.

Decision circuits 41 and 42 also provide, on leads 61 and 62, the real and imaginary components, $\hat{\delta}_j$ and $\hat{\Delta}_j$, of a complex baseband error signal $\Delta_j$ associated with the data symbol in question. The value of signal $\Delta_j$ is equal to the difference between the value of equalized signal $A_j$ and the value of the transmitted symbol. During the equalizer start-up period, in which a predetermined data stream is transmitted (to facilitate the determination of an initial set of coefficient values), the value of the transmitted symbols are known a priori. Thereafter, the equalizer/demodulator operates adaptively, with value of the transmitted symbol being taken to be (the assembly correct) decision $A_j^*$.

Assuming operation in the latter mode, baseband error signal $\Delta_j$ is equal to the quantity $(A_j - A_j^*)$. In particular, $\delta_j = (a_j - a_j^*)$ and $\hat{\delta}_j = (b_j - b_j^*)$, with $\delta_j$ and $\hat{\delta}_j$ being expressed as respective twelve-bit words. Error signal $\Delta_j$ is remodulated in error remodulator 37 to yield a remodulated, or passband, error signal $E_j$ given by $$E_j = \Delta_j e^{+j\theta_j^*}$$

The real and imaginary components of $E_j$, $e_j$ and $\hat{e}_j$, are generated by remodulator 37 in accordance with $$e_j = \delta_j \cos(\theta_j^*) - \hat{\delta}_j \sin(\theta_j^*)$$

$$\hat{e}_j = \delta_j \sin(\theta_j^*) + \hat{\delta}_j \cos(\theta_j^*)$$

To this end, remodulator 37, like modulator 27, receives $\sin(\theta_j^*)$ and $\cos(\theta_j^*)$ from carrier source 51. Components $e_j$ and $\hat{e}_j$ are extended to equalizer units 25 and 26 on a time-shared basis on lead 58 for purposes of coefficient updating, as described below. (An alternative way of generating error signal $E_j$ would be to remodulate complex decision $A_j^*$ and substract it from modulated equalized signal $Z_j$. In either case, the value of $E_j$ is the same, it being equal to the difference, modulated at the carrier frequency, between the pre- and post-quantized values of equalized signal $A_j$.)

Figure 2:
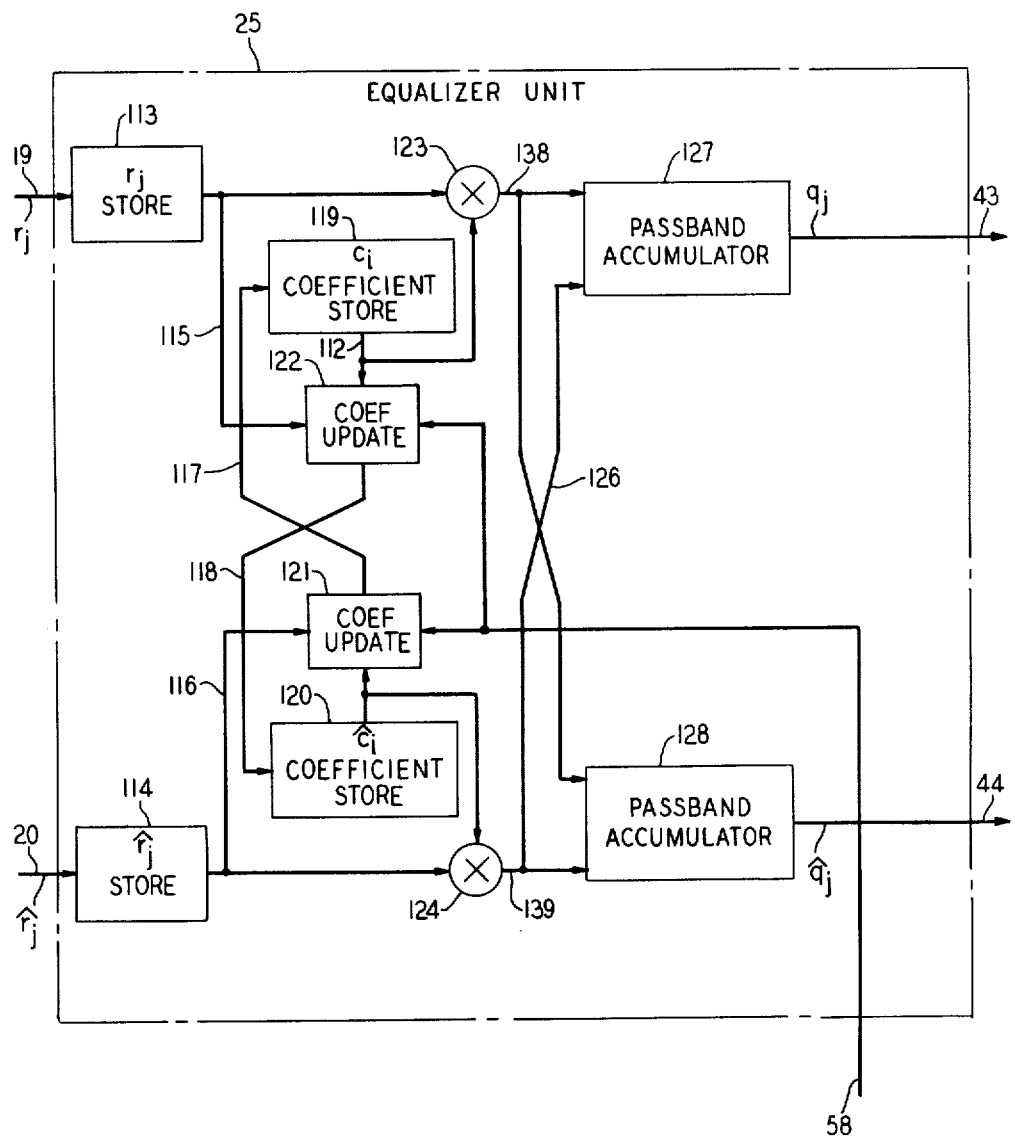
FIG. 2 shows an equalizer unit used in the equalizer/demodulator of FIG. 1.

FIG. 2 is a simplified block diagram of equalizer unit 25. The structure of equalizer unit 26 is illustratively identical to that of equalizer unit 25 and thus need not be described in detail.

As shown in FIG. 2, the $r_j$ components of sample $R_j$ are received by equalizer unit 25 on the lead 19 and stored in $r_j$ store 113. The $\hat{r}_j$ components, received on lead 20, are stored in $\hat{r}_j$ store 114. Stores 113 and 114 illustratively include respective first-in/first-out (FIFO) recirculating memories, each storage location of which represents a transversal equalizer tap position. Each store has $(2N+1)$ storage locations, N being a selected integer, so that during the $j^{th}$ receiver symbol interval, stores 113 and 114 hold the components of a plurality of $(2N+1)$ samples $R_j$ through $R_{j-2N}$ associated with the $j^{th}$ interval. Associated with the $i^{th}$ equalizer tap position, $i = (0,1 \ldots 2N)$, is a complex coefficient $C_i(j)$, which has a particular value associated with the $j^{th}$ receiver symbol interval. (In this embodiment, as described below, that value is partially updated during the interval.) The real and imaginary components $\hat{c}_i(j)$ and $c_i(j)$ of $C_i(j)$ are each represented as a twenty-four-bit word. The $c_i(j)$'s are initially held in $c_i$ coefficient store 119. The $\hat{c}_i(j)$'s are initially held in $\hat{c}_i$ coefficient store 120. Stores 119 and 120 also illustratively include FIFO memories.

During the $j^{th}$ receiver symbol interval, equalizer unit 25 generates signal $Q_j$ in accordance with $$Q_j = \sum_{i=0}^{2N} C_i(j) R_{j-i}$$

Expressed in terms of real and imaginary components, $$q_j = \sum_{i=0}^{2N} c_i(j) r_{j-i} - \sum_{i=0}^{2N} \hat{c}_i(j) \hat{r}_{j-i} \quad (1)$$

$$\hat{q}_j = \sum_{i=0}^{2N} c_i(j) \hat{r}_{j-i} + \sum_{i=0}^{2N} \hat{c}_i(j) r_{j-i} \quad (2)$$

Real component $q_j$ is generated first. In particular, the $(2N+1) r_{j-i}$ components are sequentially read out of store 113 into one input of multiplier 123. As the bits of each $r_{j-i}$ component are applied serially to one multiplier input, the bits of the corresponding coefficient component, $c_i(j)$, are serially read out of store 119 and applied to the other multiplier input. At the same time, each of the $(2N+1) \hat{r}_{j-i}$ components is read out of store 114 and multiplied in multiplier 124 by the corresponding coefficient component, $\hat{c}_i(j)$, read out of store 120. Each product formed in multipliers 123 and 124 is hereinafter referred to as a "tap product."

Only the twelve highest-order bits of each twenty-four-bit word representing each $c_i(j)$ and $\hat{c}_i(j)$ coefficient component are used in generating tap products; the other twelve bits are carried along for purposes of smoothing out the updating process. The tap products $c_i(j) r_{j-i}$ and $\hat{c}_i(j) \hat{r}_{j-i}$ appearing on leads 138 and 139, respectively, are summed in passband accumulator 127, passband accumulator 128 being inactive at this time.

The same values of coefficient components $c_i(j)$ and $\hat{c}_i(j)$ used to generate signal component $q_j$, as just described, could also be used in generating signal component $\hat{q}_j$. The coefficient component values would then be updated in preparation for the next symbol interval. In the present illustrative embodiment, however, the coefficient values used to form $q_j$ are partially updated before $\hat{q}_j$ is formed, the remainder of the updating being performed thereafter. This approach advantageously reduces the total amount of signal processing time needed during each symbol interval.

A detailed explanation of the coefficient updating process appears hereinbelow. For purposes of describing FIG. 2, however, it suffices to say that each $c_i(j)$ component, in addition to being read from store 119 into multiplier 123 for tap product generation, is also read into coefficient update unit 122, where it is partially updated. The partially updated $c_i(j)$'s pass from update unit 122 to store 120 via lead 118. Each $\hat{c}_i(j)$ component, similarly, is not only read from store store into multiplier 124, but also into coefficient update unit 121. The partially updated $\hat{c}_i(j)$'s pass from update uunit 121 into store 119 via lead 117. Thus, after component $q_j$ has been generated and stored in accumulator 127, the $c_i(j)$ and $\hat{c}_i(j)$ coefficient components, partially updated, are resident in stores 120 and 119, respectively.

Component $\hat{q}_j$ is now generated in much the same way as component $q_j$ was. The tap products $\hat{c}_i(j) r_{j-i}$ and $c_i(j) r_{j-i}$ are generated on leads 138 and 139, respectively, and are combined together in passband accumulator 128 (accumulator 127 now being inactive). The $c_i(j)$'s and $\hat{c}_i(j)$'s pass through update units 121 and 122 where the second step of the coefficient updating process is performed. The $c_i(j)$'s, now fully updated, return to store 119. The fully updated $\hat{c}_i(j)$'s are similarly returned to store 120.

The updating of coefficients $C_i(j)$ will now be described in detail. Conventionally, adaptive equalizer coefficients are updated by additively combining (i.e., adding or subtracting) an updating, or correction, term therewith. This procedure can be represented, in general, as $$C_i(j+1) = C_i(j) - \alpha F(j), \begin{cases} i = 0,1 \ldots 2N \\ j = 0,1,2 \ldots \end{cases}$$

where $\alpha$ is a predetermined positive, fractional constant and $F(j)$ is the correction term. (More generally, $\alpha$ could be a function of j.)

In accordance with the present invention, a "tap leakage" term is introduced into the conventional coefficient updating expression, that term also being additively combined with the coefficient being updated. In contradistinction to prior art tap leakage arrangements, the present tap leakage term has a magnitude which is independent of any coefficient value. In the present illustrative embodiment, more particularly, the tap leakage term has a constant magnitude $\alpha\mu$, where $\mu$ is a predetermined positive constant. The sign of the tap leakage term for the updating of a particular coefficient is such as to drive the magnitude of that coefficient in the direction of zero—positive for negative coefficients and negative for positive coefficients. The conventional coefficient updating rule is thus modified in accordance with the invention to be $$C_i(j+1) = C_i(j) - \alpha F(j) - \alpha\mu sgn\ [C_i(j)],$$

where the value of the function sgn [x] is either $+1$ or $-1$, depending on the sign of x.

The value of $\mu$ is arrived at empirically. It should be sufficiently large to maintain the coefficient values at acceptable levels. It should not, however, be so large as to severely degrade equalizer performance.

The so-called mean-squared error algorithm is used in the present embodiment to determine the value of $F(j)$ and, typically, $F(j)$ would be a function of $E_j$. In this embodiment, however, coefficient updating begins before signal $E_j$ has been formed. Accordingly, error signal $E_{j-1}$, which was formed during the previous, $(j-1)^{st}$, symbol interval, is used instead, yielding an $F(j)$ given by $E_{j-1}R_{j-i-1}$. The complete mean-squared error/tap leakage updating rule is then $$C_i(j+1) = C_i(j) - \alpha E_{j-1}R_{j-i-1} - \alpha\mu sgn[C_i(j)].$$

This is expressed in terms of real and imaginary components as $$c_i(j+1) = c_i(j) - \alpha e_{j-1}r_{j-i-1} + \alpha \hat{e}_{j-1}\hat{r}_{j-i-1} \\ - \alpha\mu sgn[c_i(j)]. \quad (3)$$

$$\hat{c}_i(j+1) = \hat{c}_i(j) - \alpha e_{j-1}\hat{r}_{j-i-1} - \alpha \hat{e}_{j-1}r_{j-i-1} - \alpha\mu sgn\cdot \\ [\hat{c}_i(j)]. \quad (4)$$

As previously noted, the structure of equalizer unit 26 is illustratively identical to that of equalizer unit 25. Thus, the output $Q_j'$ of equalizer unit 26 can be expressed in terms of a second set of complex coefficients $C_i'(j)$ as $$Q_j' = \sum_{i=0}^{2N} C_i'(j)R_{j-i}$$

so that $$Z_j = Q_j + Q_j' = \sum_{i=0}^{2N} [C_i(j)R_{j-i} + C_i'(j)R_{j-i}]$$

Thus, also, the updating relation for the $C_j'(j)$'s is $C_i'(j+1) = C_i'(j) - \alpha F'(j) - \alpha\mu sgn[C_i'(j)]$, where, illustratively, $F'(j) = E_{j-1}R_{j-i-1}'$.

Attention is now redirected to FIG. 2. Since the coefficient updating is a function of error values, coefficient update units 121 and 122 each receive the remodulated error components which appear on lead 58, as previously described. Coefficient updating is also a function of sample values. To this end, update unit 122 receives sample components from store 113 via lead 115, while update unit 121 receives sample components from store 114 via lead 116. Concomitant with the generation of signal component $q_j$, in particular, update unit 122 subtracts $\alpha e_{j-1}r_{j-i-1}$ and $\alpha\mu sgn[c_i(j)]$ from the $\hat{c}_i(j)$'s while update unit 121 subtracts $\alpha e_{j-1}\hat{r}_{j-i-1}$ from the $c_i(j)$'s. Concomitant with the subsequent generation of $\hat{q}_j$, update unit 122 subtracts $\alpha \hat{e}_{j-1}r_{j-i-1}$ and $\alpha\mu sgn$-$[\hat{c}_i(j)]$ from the $\hat{c}_i(j)$'s. Update unit 121 at this time adds $\alpha \hat{e}_{j-1}\hat{r}_{j-i-1}$ to the $c_i(j)$'s. The $c_i(j)$ and $\hat{c}_i(j)$ components of coefficients $C_i(j)$ are thus fully updated in accordance with Eqs. (3) and (4).

Figure 3:
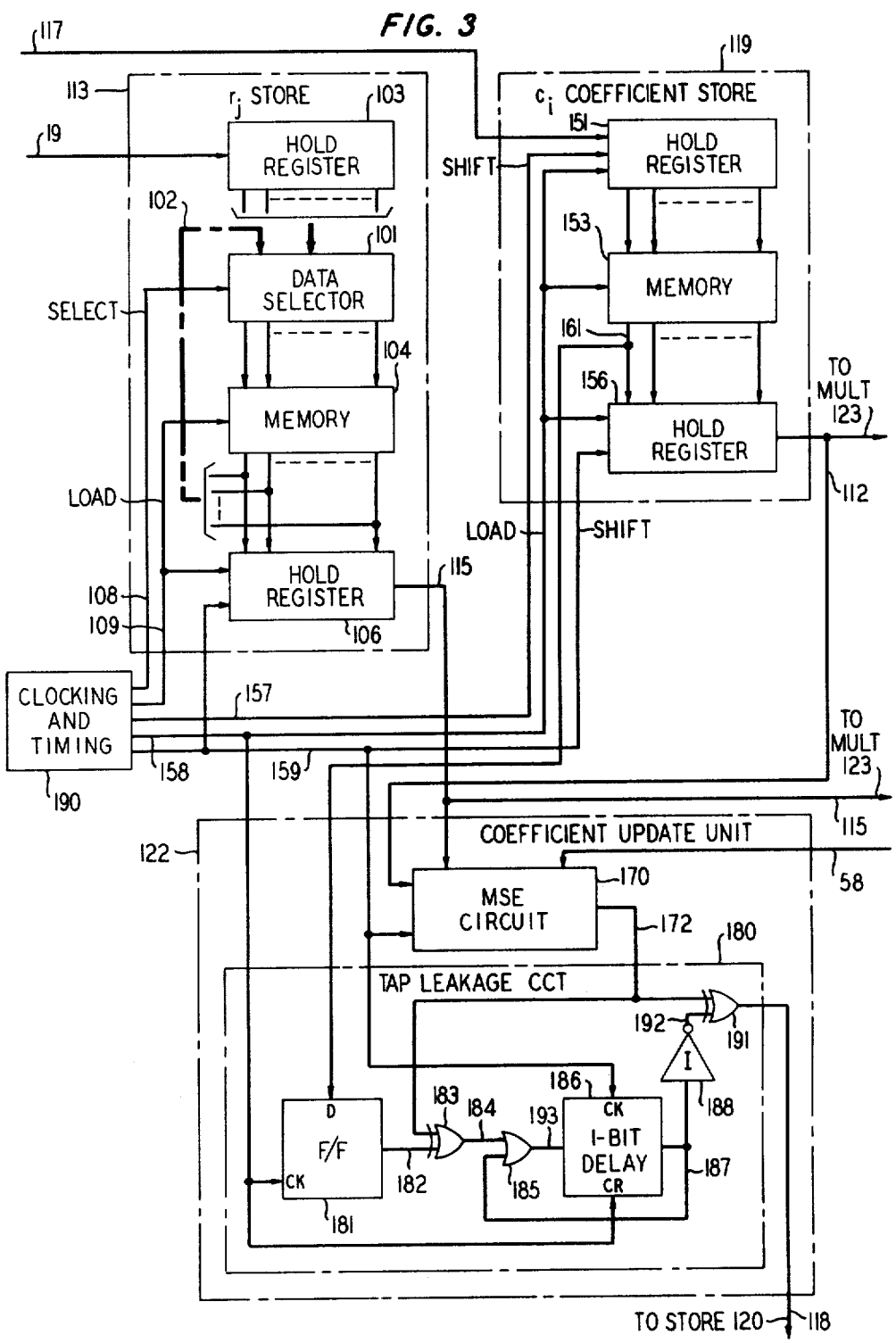
FIG. 3 shows further details of the equalizer unit of FIG. 2.

Attention is now directed to FIG. 3 which shows additional details of $r_j$ store 113, $c_i$ coefficient store 119 and coefficient update unit 122. Store 113, to which store 114 (FIG. 2) is similar, includes data selector 101, input and output hold registers 103 and 106, and FIFO memory 104. Store 119, to which store 120 is similar, includes input and output hold registers 151 and 156 and FIFO memory 153. Update unit 122 includes MSE circuit 170 which, in combination with a similar circuit in update unit 121, provides conventional mean-squared error updating. Update unit 122 further includes tap leakage circuit 180, which generates the tap leakage term of the present invention.

The operation of the circuitry of FIG. 3 to provide coefficient component updating will now be described. Assume, by way of example, that coefficient multiplication and updating during the current receiver symbol interval have been in progress for a short while so that several of the $c_i(j)$'s resident in store 119 at the start of the symbol interval have already been multiplied by a sample component in multiplier 123 and partially updated in update unit 122. At this point, load pulse is provided on lead 158, which extends from the receiver's timing and clock circuit 190. This load pulse causes the next $c_i(j)$ in the queue of memory 153 to be loaded in parallel form into register 156. The load pulse also causes the $\hat{c}_i(j)$ most recently updated in update unit 121, which is now stored in register 151, to be entered at the end of the queue within memory 153.

A sequence of twenty-four shift pulses is now provided from circuit 190 on lead 159. These pulses cause the bits of the coefficient component $c_i(j)$ held in register 156 to be shifted out to update unit 122 via lead 112. At this time, sample component $r_{j-i-1}$ is resident in output hold register 106 of store 113. The above-mentioned shift pulses on lead 159 cause the bits of that sample component to be shifted to MSE update circuit 170 via lead 115 in synchronism with the bits of coefficient component $c_i(j)$ on lead 112. (Multiplier 123 is inactive at this time and ignores the signals on leads 112 and 115.) The bits of remodulated error component $e_{j-1}$, now resident in remodulator 37 (FIG. 1), are serially fed into MSE circuit 170 via lead 58 in synchronism with the coefficient and sample components. The value of $\alpha$ is permanently stored in circuit 170. The latter is thus provided with all the signals needed to subtract $\alpha e_{j-i} r_{j-i-l}$ from each incoming $c_i(j)$ per Eq. (3), concomitant with the formation of signal component $q_j$. A circuit similar to circuit 170, comprising the whole of update unit 121 (FIG. 2), subtracts $\alpha e_{j-i} \hat{r}_{j-i-l}$ from each $\hat{c}_i(j)$, per Eq. (4).

There is negligible delay in MSE circuit 170, the output bits thereof being extended, lowest-order bit first, to tap leakage circuit 180 via lead 172—again in synchronism with the shift pulses on lead 159. MSE circuit 170 is readily realized with standard arithmetic circuitry. It thus need not be described in further detail.

Coefficient components $c_i(j)$ and $\hat{c}_i(j)$ are illustratively represented in two's complement notation, with the highest-order bit being the sign bit—"0" for positive and "1" for negative. Reducing the magnitude of a coefficient component by $\alpha\mu$ in accordance with the invention means subtracting that amount from the binary word which represents that component if the latter has a positive value and adding that amount to the binary word if the component has a negative value. In the present illustrative embodiment, the magnitude $\alpha\mu$ is equal to the value represented by the least significant coefficient component bit. Thus, implementation of the invention requires tap leakage circuit 180 to add or subtract a binary "1" from each coefficient component received from MSE circuit 170, depending on the sign of the component.

The procedure followed in tap leakage circuit 180 to subtract (add) a binary "1" from an incoming coefficient component is as follows: As long as the incoming bits are "0" ("1"), they are inverted to "1" ("0"). The lowest order "1" ("0") in the word is inverted to "0" ("1"). All other bits are unchanged.

Turning now to the operation of tap leakage circuit 180, it will be appreciated from the foregoing that the lowest-order coefficient component bit is always to be inverted. To this end, the above-mentioned load pulse on lead 158 provides the further function of clearing to "0" a one-bit delay 186 in tap leakage circuit 180, delay 186 being clocked from the pulses on shift lead 159. Inverter 188 provides on lead 192 an inverted version of the output of delay 186. Lead 192 is connected to one input of exclusive-OR gate 191. The incoming coefficient component bits on lead 172 are applied to the other input of gate 191. Lead 192 initially carries a "1", so that, as desired, the lowest-order bit on lead 172 is inverted in gate 191. The output of gate 191 is provided on lead 118.

The load pulse on lead 158 provides the further function of clocking the coefficient component sign bit, which first appears on output lead 161 of memory 153, into D-type sign flip-flop 181 of circuit 180. Assume that the sign bit is "0", indicating a positive coefficient component from which a binary "1" is to be subtracted. The output of flip-flop 181 is extended to one input of exclusive-OR gate 183 on lead 182. Since that lead carries a "0" throughout the updating of the coefficient component at hand, the output of exclusive-OR gate 183 on lead 184 is equal to the value of the current coefficient component bit on lead 172.

Thus, if the lowest-order coefficient component bit on lead 172 is "1", a "1" will appear at the output of delay 186 when the second bit appears on lead 172, that "1" having been previously passed to lead 193 by OR gate 185. Lead 192 thus carries a "0" and, as desired, the second bit passes through gate 191 uninverted. Moreover, since the output of delay 186 feeds back into its own input via lead 187 and OR gate 185, lead 192 continues to carry a "0" and all subsequent coefficient component bits similarly pass uninverted through gate 191.

If, on the other hand, the lowest-order bit on lead 172 is "0", the output of delay 186 will be "0" when the second bit appears on lead 172. That bit, therefore, is also inverted in gate 191, as desired. Moreover, as long as the bits on lead 172 continue to be "0", they are similarly inverted by gate 191, as is the first "1" which appears on lead 172. Thereafter, however, lead 192 will again carry a "0" and, as before, all subsequent bits will pass through gate 191 uninverted.

Circuit 180 operates in a complementary fashion to that described above to add a "1" to the words on lead 172 which represent negative coefficient components.

Larger values of $\alpha\mu$ can be implemented with a structure similar to circuit 180 by allowing k bits on lead 172 to pass through gate 191 undisturbed, while holding delay 186 in the "0" state. The value of $\alpha\mu$ thus realized is equal to the value of the least significant coefficient component bit multiplied by $2^k$.

As with MSE circuit 170, there is negligible delay in tap leakage circuit 180. Thus, overall, the bits of the partially updated $c_i(j)$'s appear on output lead 118 of update unit 22 in synchronism with the bits coming in on lead 112. Coefficient update unit 121 operates similarly. Thus, the bits of a partially updated $\hat{c}_i(j)$ appear on lead 117 in synchronism with the shift pulses on lead 159. These bits are gated into register 151 of coefficient store 119 via twenty-four shift pulses provided from circuit 190 on lead 157.

The bits of component $r_{j-i-1}$ are still present at the output of memory 104. These are extended in parallel form to one of the multibit data inputs of data selector 101 of store 113 via lead bundle 102. The present logic state of selection lead 108, which extends from circuit 190, indicates to selector 101 that the signal on lead bundle 102 is to be applied to the input of memory 104. That signal is now recirculated into memory 104 by a load pulse received from circuit 190 on lead 109. The load pulse also causes the next sample component in the memory queue, component $r_{j-i}$, to be loaded into hold register 106.

Another sequence of twenty-four shift pulses now appears on lead 159. The value that component $c_i(j)$ had prior to being partially updated, as just described, is still resident in hold register 156. Thus, the pulses on lead 159 cause the bits of $c_i(j)$ and $r_{j-i}$ to be serially shifted onto leads 112 and 115 from registers 156 and 106 in order for multiplier 123 to form the tap product $c_i(j)r_{j-i}$. (Coefficient update unit 122 is inactive at this time and ignores the signals on leads 112 and 115.)

Another load pulse now appears on lead 158, the whole process repeating for each successive $c_i(j)$—and in update unit 121, each $\hat{c}_i(j)$—unit all of the tap products comprising $q_j$ have been formed and all the coefficient components partially updated.

The remainder of the coefficient updating, which occurs concomitantly with the formation of $\hat{q}_j$, proceeds similarly, with MSE circuit 170 (and the corresponding circuit in update unit 121) repetitively receiving error component $\hat{e}_{j-1}$ along with each $\hat{c}_i(j)$ and $r_{j-i-1}$ (or $c_i(j)$ and $\hat{r}_{j-i-1}$ in the case of update unit 121) to generate the coefficient correction terms. Once $\hat{q}_j$ has been formed and the coefficient components fully updated, the logic state of selection lead 108 changes. Thereafter, in an early portion of the next, $(j+1)^{st}$, receiver symbol interval, memory 104 is pulsed via lead 109 once more. This operation causes the just-generated sample component, $r_{j+1}$, previously shifted into hold register 103 from output lead 19 of delay 23 (FIG. 1) to be read into the queue of memory 104. This newest sample component supplants the oldest sample component, which would have otherwise been recirculated into the memory from lead bundle 102.

The present invention is illustrated herein in the context of a QAM data system. It will be appreciated, however, that the present tap leakage technique for fractionally-spaced equalizers is equally applicable to systems using other modulation techniques and, indeed, to baseband fractionally-spaced equalizers, as well. It is also applicable to other receiver structures, such as those in which the received signal is demodulated first and then equalized at baseband. Finally, there may be applications in which the present tap leakage technique is efficacious for baud, as well as fractionally-spaced, equalizers.

Thus, although a specific application of the invention and specific circuitry embodying same are shown and described herein, various other arrangements embodying the principles of the invention may be devised by those skilled in the art without departing from their spirit and scope.

We claim:

1. An arrangement for processing a received data signal which was transmitted over a transmission channel at a rate of 1/T symbols per second comprising
   sampling means (11, 12, 16) for forming a succession of samples of said signal at a predetermined rate
   means for forming a decision as to the value of each one of said symbols and for forming an error signal associated with each symbol, the last-mentioned means comprising means (25, 26) for multiplying each successive one of an ordered plurality of coefficients with a successive respective one of a plurality of said samples associated with said decision, means (27, 34, 35, 51) responsive to the resulting products for generating an equalized signal, and means (41, 42) for quantizing said equalized signal to form said decision, the value of said error signal being a function of the value of said equalized signal and the value of said one of said symbols, and
   updating means (121, 122) for determining at least a first value for each one of said coefficients by additively combining first and second terms with a previous value of that coefficient, said first term being a function of the error signal associated with a predetermined one of said symbols, said updating means including means (180) for subtracting the magnitude of said second term from said previous value if that value has a positive sign and for adding the magnitude of said second term to said previous value if that value has a negative sign,
   said updating means characterized in that the magnitude of said second term is independent of the magnitudes of any of said coefficients.

2. The invention of claim 1 wherein the magnitude of said second term is always non-zero.

3. The invention of claim 2 wherein the magnitude of said second term is a selected constant.

4. The invention of claim 3 wherein said predetermined rate exceeds 1/T samples per second.

5. The invention of claims 1, 3 or 4 wherein said equalized signal generating means includes means (127, 128) for summing said products.

6. The invention of claim 3 wherein said data signal is a data signal modulated at a predetermined carrier frequency and wherein said equalized signal generating means includes means (127, 128) for summing said products to form a modulated equalized signal and means (27, 51) for demodulating said modulated equalized signal to form said equalized signal.

7. The invention of claim 6 wherein said error signal is equal to the difference, modulated at said carrier frequency, between the pre-quantized value of said equalized signal and said decision and wherein said updating means further includes means (170) for forming said first term as a predetermined fraction of the product of said modulated difference with the sample with which said each one of said coefficients was multiplied in the formation of said decision.

8. The invention of claims 1, 3, 4 or 7 wherein said predetermined rate is at least $(1+\alpha)/T$ samples per second, where $\alpha$ is the fractional excess bandwidth.

9. An arrangement including
   sampling means (11, 12, 16) for forming samples of a received data signal which was transmitted over a transmission channel at a predetermined symbol rate, said sampling means operating at greater than said symbol rate,
   means (25, 26) operative at said symbol rate for multiplying ones of said samples by predetermined coefficients,
   decision circuit means (41, 42) responsive to the sum of the resulting products for forming a decision as to the value of each transmitted data symbol and for forming a corresponding error signal, and
   means (121, 122) for updating each of said coefficients by additively combining first and second updating terms therewith, said first term being a function of an error signal previously formed by said decision circuit means,
   said updating means characterized in that the magnitude of said second term is a constant, said magnitude being added to each negative-valued coefficient and subtracted from each positive-valued coefficient.

10. In a receiver to which a carrier signal, modulated by a succession of data symbols occurring at T second intervals, is transmitted over a band-limited channel, apparatus comprising sampling means (11, 12, 16) for forming a succession of samples of said signal at a predetermined rate and equalizer means operative during each one of a succession of T second intervals for forming a decision as to the value of an individual one of said symbols, said equalizer means comprising
   means (25, 26) for multiplying at least individual ones of a predetermined number of the most recently formed ones of said samples with individual ones of a plurality of coefficients, each coefficient having a predetermined value associated with said one of said intervals, means (27, 51) for demodulating the sum of the resulting products to form a demodulated equalized signal, means (37, 41, 42) responsive to said demodulated equalized signal for forming said decision and for forming a passband error signal, said passband error signal being equal to the difference, multiplied by said carrier signal, between said demodulated equalized signal and a signal representing said symbol value, and means (121, 122) for determining the value of said each coefficient associated with a subsequent one of said intervals by additively combining first and second updating terms therewith, the magnitudes of said first term being equal to a predetermined fraction of the product of a passband error signal formed during a predetermined one of said intervals with the sample with which said each coefficient was multiplied during said predetermined one of said intervals, the magnitude of said second term being a constant, and the sign of said second term being such as to drive the value of said each coefficient toward zero.

11. The invention of claim 10 wherein said predetermined rate is at least equal to $(1+\alpha)/T$ samples per second, where $\alpha = (2Tf_{co}-1)$, $f_{co}$ being the highest spectral component about said carrier signal having at least a predetermined minimum energy, and wherein said signal representing said symbol value is derived from said decision.

12. The invention of claim 11 wherein the magnitude of said second term is subtracted from said each coefficient if the latter has a positive sign and is added to said each coefficient if the latter has a negative sign.

13. A data receiver for a received modulated data signal transmitted to said receiver over a bandlimited channel, said signal including a succession of data symbols transmitted at a symbol rate of 1/T symbols per second, said receiver comprising first means (11, 12, 16) for generating first and second time-spaced passband samples $R_j$ and $R_j'$ of said received signal during the $j^{th}$ one of a succession of T second intervals, second means (25, 26, 34, 35) for forming the summation $$Z_j = \sum_{i=0}^{2N} [C_i(j)R_{j-i} + C_i'(j)R_{j-i}'],$$

where N is a selected integer and the $C_i(j)$'s and $C_i'(j)$'s are coefficients having at least first respective values, third means (27, 41, 42, 51) responsive to said summation $Z_j$ for forming a decision $A_j^*$ as to the value of an individual one of said symbols, and fourth means (121, 122) for determining the values of the coefficients $C_i(j+1)$ and $C_i'(j+1)$ in accordance with $$C_i(j+1) = C_i(j) - \alpha F(j) - \alpha\mu sgn[C_i(j)]$$

$$C_i'(j+1) = C_i'(j) - \alpha F'(j) - \alpha\mu sgn[C_i'(j)]$$

where F(j) and F'(j) are predetermined correction terms, $\alpha$ and $\mu$ are predetermined constants, and the function sgn [x] has unity magnitude and has the sign of x.

14. The invention of claim 13 wherein said third means includes means for forming a passband error signal $E_j$ corresponding to said decision $A_j^*$ and wherein in said fourth means, $F(j) = E_{j-1}R_{j-i-1}$ and $F'(j) = E_{j-1}R_{j-i-1}'$.

15. The invention of claim 13 wherein said third means includes means (27, 51) for forming a signal $A_j$ which is a demodulated version of said summation $Z_j$, and means (41, 42) for quantizing said signal $A_j$ to form said decision $A_j^*$.

16. The invention of claims 14 or 15 wherein said passband error signal forming means includes means (37, 51) for generating a signal equal to a remodulated version of the quantity $(A_j - A_j^*)$ to form said passband error signal $E_j$.

17. The invention of claim 16 wherein modulated data signal is a complex data signal, wherein said sample generating means includes means (11) for forming first and second replicas of said received signal, said replicas being a Hilbert Transform pair, and means (12) for individually sampling said replicas to form first and second components of each of said samples $R_j$ and $R_j'$, and wherein said signal $A_j$ is equal to $Z_j e^{-j(\theta_j^*)}$ and said passband prior signal $E_j$ is equal to $(A_j - A_j^*)e^{+j(\theta_j^*)}$, $\theta_j^*$ being an estimate of the current phase of the carrier of said data signal.

18. A method for processing a received data signal which was transmitted over a transmission channel at a rate of 1/T symbols per second comprising the steps of forming a succession of samples of said signal at a predetermined rate, forming a decision as to the value of each one of said symbols, said decision forming step comprising the steps of multiplying each successive one of an ordered plurality of coefficients with a successive respective one of a plurality of said samples associated with said decision, generating an equalized signal in response to the resulting products, and quantizing said equalized signal to form said decision, forming an error signal associated with each symbol, the value of said error signal being a function of the value of said equalized signal and the value of said one of said symbols, and determining at least a first value for each one of said coefficients by additively combining first and second terms with a previous value of that coefficient, said first term being a function of the error signal associated with a predetermined one of said symbols, said determining step including the step of subtracting the magnitude of said second term from said previous value if that value has a positive sign and adding the magnitude of said second term to said previous value if that value has a negative sign, said determining step characterized in that the magnitude of said second term is independent of the magnitudes of any of said coefficients.

19. The invention of claim 18 wherein the magnitude of said second term is always non-zero.

20. The invention of claim 19 wherein the magnitude of said second term is a selected constant.

21. The invention of claim 20 wherein said predetermined rate exceeds 1/T samples per second.

22. The invention of claims 18, 20 or 21 wherein said equalized signal generating step includes the step of summing said products.

23. The invention of claim 20 wherein said data signal is a data signal modulated at a predetermined carrier frequency and wherein said equalized signal generating step includes the steps of summing said products to form a modulated equalized signal and demodulating said modulated equalized signal to form said equalized signal.

24. The invention of claim 23 wherein said error signal is equal to the difference, modulated at said carrier frequency, between the pre-quantized value of said equalized signal and said decision and wherein said determining step includes the step of forming said first term as a predetermined fraction of the product of said modulated difference with the sample with which said each one of said coefficients was multiplied in the formation of said decision.

25. The invention of claims 18, 20, 21 or 24 wherein said predetermined rate is at least $(1+\alpha)/T$ samples per second, where $\alpha$ is the fractional excess bandwidth.

26. A method including the steps of
forming samples of a received data signal which was transmitted over a transmission channel at a predetermined symbol rate, said samples being formed at greater than said symbol rate,
multiplying ones of said samples by predetermined coefficients at said symbol rate,
forming a decision as to the value of each transmitted data symbol in response to the sum of the resulting products,
forming an error signal corresponding to said decision, and
updating each of said coefficients by additively combining first and second updating terms therewith, said first term being a function of the error signal corresponding to a previously formed decision,
said updating step characterized in that the magnitude of said second term is a constant, said magnitude being added to each negative-valued coefficient and subtracted from each positive-valued coefficient.

27. A method for use in a receiver to which a carrier signal, modulated by a succession of data symbols occurring at T second intervals, is transmitted over a band-limited channel, said method comprising the steps of forming a succession of samples of said signal at a predetermined rate and forming during each one of a succession of T second intervals a decision as to the value of an individual one of said symbols, said decision forming step comprising the steps of
multiplying at least individual ones of a predetermined number of the most recently formed ones of said samples with individual ones of a plurality of coefficients, each coefficient having a predetermined value associated with said one of said intervals,
demodulating the sum of the resulting products to form a demodulated equalized signal,
forming said decision and a passband error signal in response to said demodulated equalized signal, said passband error signal being equal to the difference, multiplied by said carrier signal, between said demodulated equalized signal and a signal representing said symbol value, and
determining the value of said each coefficient associated with a subsequent one of said intervals by additively combining first and second updating terms therewith, the magnitude of said first term being equal to a predetermined fraction of the product of a passband error signal formed during a predetermined one of said intervals with the sample with which said each coefficient was multiplied during said predetermined one of said intervals, the magnitude of said second term being a constant, and the sign of said second term being such as to drive the value of said each coefficient toward zero.

28. The invention of claim 27 wherein said predetermined rate is at least equal to $(1+\alpha)/T$ samples per second, where $\alpha = (2Tf_{co}-1)$, $f_{co}$ being the highest spectral component about said carrier signal having at least a predetermined minimum energy, and wherein said signal representing said symbol value is derived from said decision.

29. The invention of claim 28 wherein the magnitude of said second term is subtracted from said each coefficient if the latter has a positive sign and is added to said each coefficient if the latter has a negative sign.

30. A method for use in a data receiver for a received modulated data signal transmitted to said receiver over a band-limited channel, said signal including a succession of data symbols transmitted at a symbol rate of $1/T$ symbols per second, said method comprising the steps of
generating first and second time-spaced passband samples $R_j$ and $R_j'$ of said received signal during the $j^{th}$ one of a succession of T second intervals,
forming the summation $$Z_j = \sum_{i=0}^{2N}[C_i(j)R_{j-i} + C_i'(j)R_{j-i}']$$

where N is a selected integer and the $C_i(j)$'s and $C_i'(j)$'s are coefficients having at least first respective values,
forming a decision $A_j^*$ in response to said summation $Z_j$ as to the value of an individual one of said symbols, and
determining the values of the coefficients $C_i(j-1)$ and $C_i'(j-1)$ in accordance with $$C_i(j+1) = C_i(j) - \alpha F(j) - \mu \, \text{sgn}[C_i(j)]$$

$$C_i'(j+1) = C_i'(j) - \alpha F'(j) - \mu \, \text{sgn}[C_i'(j)]$$

where $F(j)$ and $F'(j)$ are predetermined correction terms, $\alpha$ and $\mu$ are predetermined constants, and the function sgn $[x]$ has unity magnitude and has the sign of $x$.

31. The invention of claim 30 wherein said $A_j^*$ forming step includes the step of forming a passband error signal $E_j$ corresponding to said decision $A_j^*$ and wherein in said determining step $F(j) = E_j \cdot R_{j-i-1}$ and $F'(j) = E_j \cdot R_{j-i-1}'$.

32. The invention of claim 30 wherein said $A_j^*$ forming step includes the steps of forming a signal $A_j$ which is a demodulated version of said summation $Z_j$, and quantizing said signal $A_j$ to form said decision $A_j^*$.

33. The invention of claims 31 or 32 wherein said passband error signal forming step includes the step of generating a signal equal to a remodulated version of the quantity $(A_j - A_j^*)$ to form said passband error signal $E_j$.

34. The invention of claim 33 wherein modulated data signal is a complex data signal,
wherein said sample generating step includes the steps of forming first and second replicas of said received signal, said replicas being a Hilbert Transform pair, and individually sampling said replicas to form first and second components of each of said samples $R_j$ and $R_j'$,
and wherein said signal $A_j$ is equal to $Z_j e^{-j(\theta_j^*)}$ and said passband prior signal $E_j$ is equal to $(A_j - A_j^*)e^{+j(\theta_j^*)}$, $\theta_j^*$ being an estimate of the current phase of the carrier of said data signal.

* * * * *